June 22, 1965  A. L. ZANOW  3,190,458
HEAVY DUTY BUFFING DEVICE
Original Filed Nov. 30, 1962
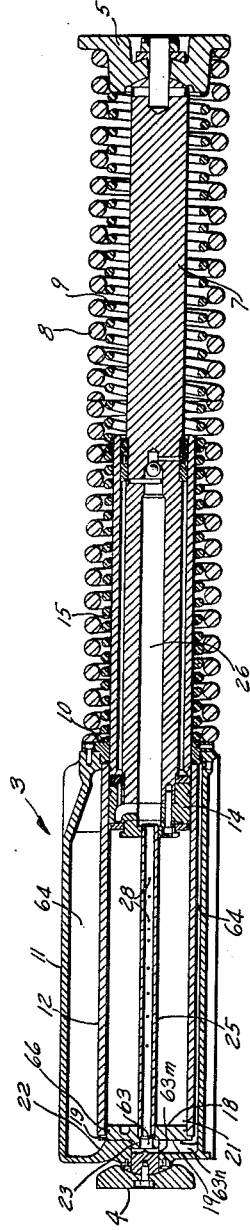
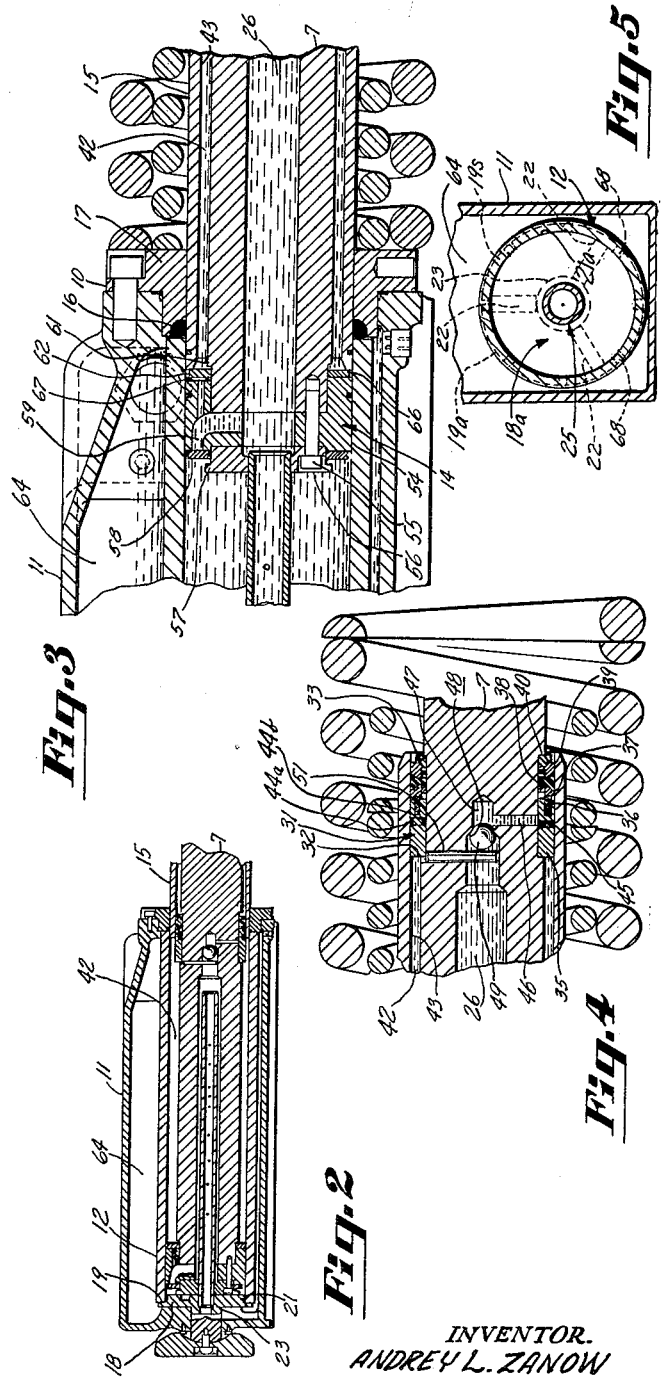
INVENTOR.
ANDREY L. ZANOW
BY
*Henry Kozak*
ATTORNEY United States Patent Office 3,190,458
Patented June 22, 1965

3,190,458
HEAVY DUTY BUFFING DEVICE
Andrey L. Zanow, Cleveland, Ohio, assignor to National Castings Company, Cleveland, Ohio, a corporation of Ohio
Continuation of application Ser. No. 241,285, Nov. 30, 1962. This application Mar. 1, 1965, Ser. No. 438,461
9 Claims. (Cl. 213—43)

This invention relates to a hydraulic shock absorbing device adapted for use with heavy vehicles such as railway cars. The invention is concerned particularly with buffing devices which are currently regarded as having unusually long cushioning strokes, e.g., two feet or more, and have recoil damping mechanism adapting such devices for railway car "sliding sill" construction. This application is a continuation of United States application, Serial No. 241,285, filed November 30, 1962, and now abandoned.

An important object of the invention is to provide long-travel, heavy-duty buffing devices in which the radial support of an assembly movable within the device comprising its piston and the piston rod therefor is obtained primarily at two longitudinally spaced points to thereby achieve substantial economies in manufacturing without sacrifice of performance or maintenance economy.

A further object is to provide buffing devices in accordance with the foregoing object which are inherently free of oil leakage.

Still another object is to provide a buffing device which is of open construction between the piston and the seal for the piston rod thereof while also providing effective recoil snubbing.

Broadly speaking, this invention resides in a hydraulic buffer for railway vehicles, or the like, comprising a cylinder having an open rear end and a front end substantially enclosed by a cylinder head or wall; a piston reciprocable within the cylinder with a piston rod therefor extending rearwardly through and beyond the open cylinder end; a cylinder extension, preferably of smaller internal diameter than the cylinder, normally joining with the cylinder adjacent its open end, and extending rearwardly in coaxial relation with both the cylinder and the rod; an annular sealing medium surrounding the piston rod and secured thereto in fixed longitudinal relationship to tightly engage the full circumference of the inner surface of the cylinder extension and be carried lengthwise thereof by the rod; a reservoir normally constructed around the cylinder and the head thereof and connected with the cylinder for the exchange of liquid for receiving and discharging liquid in accordance with decreases and increases in the volume of the cylinder and the space between the rear of the piston and the sealing medium. Finally, the buffer includes appropriate duct system for the transfer of liquid between the space rearward of the piston and the liquid storage region provided by the cylinder and the reservoir since increases and decreases in the volume of this space occur in the operation of the buffer.

The invention further includes structure for returning liquid leaking by a portion of the piston rod seal to a region contiguous with the interior of the cylinder.

In the drawing with respect to which this invention is described below:

FIG. 1 is a central longitudinal cross section in elevation of a hydraulic buffer in accordance with the invention in its fully extended or open condition.

FIG. 2 is a fragmentary central longitudinal cross section in elevation of the buffer of FIG. 1 in its contracted or closed condition.

FIG. 3 is a fragmentary enlargement of an intermediate portion of FIG. 1 including the junction of the cylinder with the cylinder extension.

FIG. 4 is a fragmentary enlargement of a portion of FIG. 1 illustrating the rear portion of a cylinder extension of the buffer and the sealing medium carried by the piston rod.

FIG. 5 is a fragmentary transverse cross section in elevation of the forward end portion of a buffer incorporating a modified cylinder head and relationship thereof with the cylinder.

FIG. 1 illustrates a buffer 3 substantially in its entirety adapted as to general arrangement to fit in a pocket resembling the conventional draft gear pocket of a railway vehicle. Normally, the terminal abutment pieces of the buffer 4 and 5 will engage stops (not shown) of draft gear pocket structure fixed within a vehicle, and also be engaged by stops or abutments (not shown) of an oscillating device, e.g., the buff-and-draft column of so-called "sliding sill" arrangements. As shown, the abutment piece 5 is attached to a piston rod 7 by a structure permitting limited swivel action. The piece 5 is of generally annular conformation adapting it as a spring seat for a pair of springs 8 and 9 which stand in a state of initial compression between the piece 5 and a flange 10 bolted to the rear end of a housing 11.

Other basic components of the buffer are a cylinder 12 supported internally of the housing 11, a piston 14 reciprocable lengthwise of the cylinder, a tubular cylinder extension 15 extending rearwardly from the open rear end of the cylinder 12 in coaxial relation with the cylinder and the piston rod 7. A front edge portion of the extension 15 extends inside and longitudinally overlaps a rear end edge portion of the cylinder 12 as shown most plainly in FIG. 3. The flange 10 is fixed to the extension 15 by means, such as the weld 16 shown. The flange is bolted to the housing to hold the extension 15 in the longitudinally overlapping and coaxial relation with the cylinder 12. In this manner the rear end of the cylinder is positioned with respect to the housing. The front end of the cylinder seats against a head 18 along an outer radial flange 19 of the head. Radial registry of the cylinder with the head is established along a drum surface 21 of the head 18 adjacent the flange 19. The drum surface extends internally of the forward end of the cylinder. The housing 11 comprises a plurality of lugs 22 in concentric arrangement with the axis of the cylinder, e.g., three lugs spaced 120 degrees apart to engage a concentric boss 23 fitting within the lugs. The front face of the head 18 abuts against the rear surfaces of the lugs. In this manner, the cylinder 12 and the head 18 are fixedly positioned relative to the housing 11.

The head 18 has a further function of supporting a metering tube 25 fixed thereto in coaxial arrangement with the head, the cylinder and an elongate bore or opening 26 extending through the assembly comprising the piston 14 and the piston rod 7. As shown, the opening extends from the front face of the piston rearwardly for a length at least equal to that of the portion of the metering tube extending rearwardly of the head 18. The front end portion of the opening 26 closely conforms to the outer periphery of the tube 25 to restrict the flow of liquid therepast and to thus enhance the hydraulic resistance of the buffer to external compression loads. The metering tube has minute apertures 28 of predetermined aggregate area and pattern through its tubular wall which permit transfer of liquid between the region within the cylinder surrounding the tube and the interior of the tube during both closing and return strokes of the piston and the piston rod assembly.

The piston rod is maintained in concentric or coaxial relation with the extension 15 by the concentric relation of the piston and the cylinder, and also by a sealing mechanism 31 carried on the piston rod in fixed longitudinal relation therewith. As shown in FIG. 4, the outer surface of the piston rod 7 is undercut to provide shoulders 32 and 33 between which annular sealing means, such as the sealing mechanism 31, is retained at a fixed point along the rod length. The mechanism 31 seals the space disposed forwardly from the mechanism within the cylinder extension and the cylinder from the atomosphere or space rearwardly adjacent to the mechanism. The sealing mechanism, as shown, comprises a rigid ring 35 of a material such as metal, a plurality of small compression springs 36 backstopped by the ring 35 and pushing against another ring 37. The sealing mechanism further includes a ring 38 of soft yieldable material disposed between the ring 37 and another ring 39 of rigid material which seats on a retaining ring 40. The resilient ring 38 is thus squeezed against the inner surface of the extension 15 by lateral compressive forces originating in the springs 36. The rings just mentioned may be of split construction for convenience of installation.

Proceeding to an important feature of the invention, structure is now to be described which feeds any liquid leaking by the front portion of the seal, i.e., the ring 35, back into the internal regions of the piston and cylinder assembly. It is characteristic of the operation of the buffer herein described that the space 42, disposed in a radial direction between the outer surface of the piston rod and the inner surface 43 of the extension 15, and in a longitudinal direction between the sealing mechanism and the rear face of the piston 44 to define a buffer chamber back of the piston, confines liquid at the maximum pressure reached in this space when the pressure within the opening 26 is at a very low level.

In order to return liquid which leaks past the ring 35, the ring is provided, e.g., with a plurality of radial circumferentially spaced openings 45 extending from a circumferential groove 44a in the outer surface of the ring 35 to a liquid gathering circumferential groove 44b in the undercut surface of the piston rod. The groove 44b intersects with a pressure-relief passageway, i.e., a radial bore 46, contiguous with a rear terminal portion 47 of reduced diameter of the opening 26. Portion 47 of the opening forms a shoulder 48 with an adjacent portion of the opening of larger diameter suitable as a seat for a ball 49 cooperating therewith and together forming a check valve. A pin 51 trapped in a radial bore therefor by the ring 35 maintains the ball 47 in the vicinity of the shoulder 48.

Inspecting now the enlarged view of the portion of the buffer comprising the juncture of the cylinder, the housing and the cylinder extension provided by FIG. 3, the piston is shown to comprise a body 54 secured to the front end of the piston rod 7 by a plurality of bolts 55. The bolts 55 also secure a retaining flange 56 providing a shoulder 57 spaced from the front face of the body for loose support of a washer 58 functioning with the front terminus of a passageway 59 as a check valve along the front face of the piston. The passageway 59 also branches rearward to form a rear terminus along the rear face of the body 54. The undercut peripheral area at the front end of the rod 7 for receiving the piston provides a shoulder 61 spaced from the rear end of the body portion 54 permitting freedom of movement of a washer 62 functioning in cooperation with the rear terminus of the passageway 59 as a check valve restricting, at one stage of operation, the flow of liquid from the space 42 through the passageway into the central opening 26. Under other conditions of operation, the washer 58 restricts the flow of liquid from the region in the cylinder surrounding the metering tube 25 into the opening 26 or the space 42.

In operation, the buffer of FIGS. 1 to 4 is of the recoilless type characterized by substantial hydraulic resistance, i.e., return stroke resistance pressure, to the buffer expanding action of the springs 8 and 9. Assuming the buffer to be fully expanded, as shown in FIG. 1, an initial increase in pressure to a high level is experienced within the cylinder 12 frontwardly of the piston as soon as buffer closure commences. Liquid is forced through the holes 28 of the metering tube as the piston moves through its pressure working stroke. Most of the liquid travels frontwardly within the tube into the central and radial openings 63 and 63m, respectively, of the boss 23, and a radial passageway 63n of the housing, into the reservoir region 64 defined by the outer wall of the housing 11 and the cylinder 12. The region 64, in addition to a reserve supply of oil, also contains a pocket of air. Some of the liquid forced out of the cylinder by the frontward moving piston travels rearwardly through the tube into the opening 26 and thence through the piston passageway 59 through the opened check valve comprising the washer 62 and into the space 42. This space is rapidly increasing in volume as the piston moves forwardly. Eventually, a condition of the buffer may be reached as shown in FIG. 2 wherein the piston is abutting the cylinder head 18.

In executing a return stroke from a condition such as that of FIG. 2, a very great reduction in pressure within the cylinder occurs as soon as the piston moves away from the cylinder head 18. As the liquid in the reservoir is subject to pressure by an air cushion confined therein, liquid immediately starts to flow from the reservoir through the head 18, and through the apertured wall of the metering tube to fill the cylinder in front of the piston. However, as soon as the piston starts to move rearwardly, pressure increases in the space 42 because of entrapment therein as the washer 62 closes off the rear terminus of the passageway 59. Restraint in the escape of liquid from the space 42 is the major impediment to return of the piston and piston rod assembly. The liquid is metered from the space 42 into the passageway 59 through a small clearance 66 of the washer 62 with the inner surface of the cylinder 12. This clearance is contiguous with one or more small grooves 67 in the rear face of the piston body 54 adjacent the front face of the washer 62. Such a groove along with the clearance 66 constitute a small orifice or channel through which liquid passes from the space 42 to the passageway 59 and then into the opening 26.

On account of the high pressure developed in the space 42 during the return stroke, some leakage of liquid past the ring 35 is inevitable. As the liquid pressure is quite low in the opening 26 at this instant, the ball 49 unseats from the shoulder 48 to return any liquid passing the ring 35 and through the duct 46 to the interior of the piston rod.

FIG. 5 illustrates in transverse section the front portion of a modified buffer wherein some parts are identical to those illustrated in FIG. 1 and other analogous parts or features are given the same numeral except that the letter "a" is added. In contrast with the embodiment of FIG. 1 wherein a sealing ring 66 is provided in the peripheral surface 21 of the head 18 to join the head and the cylinder wall in sealed relationship, the head 18a of FIG. 5 and the cylinder 12 are constructed with cooperating surfaces including a surface 21a and the radially extending rear-facing surface 19s of the flange 19a of the head to position and support the front end of the cylinder in the manner accomplished in the embodiment of FIG. 1. The essential difference between the two embodiments is that the circumferential expansion of the cylinder 12 away from the surface 21a occurs at the pressures under which buffers in accordance with this invention are operated. Such expansion provides clearance between opposed axially extending surfaces of the head and the cylinder which meters liquid from the cylinder into the reservoir. That is to say, the end portion of the cylinder 12 overlapping the surface 21a expands in a radial direction away from the surface to permit the passage of liquid into a plurality of radially extending grooves 68 in the flange 19a, i.e., in the surface 19s of the flange 19a and thence into the reservoir region 64. The grooves 68 enable the flange 19a to be used as a seat for axially positioning the cylinder 12. Provision of the grooves 68 is optional when the casing is designed for the deformation entailed in forcing a clearance between the flange 19a and the end surface of the cylinder 12. The thickness of the cylinder wall 12 is predetermined in accordance with the operating pressures used, the service contemplated, the amount of metering resorted to in the use of the metering tube, and associated ducts connecting the tube with the reservoir. It is obvious that the expanding cylinder wall for metering liquids may be used in combination with other metering media in a variety of ways. For example, the expanding wall of FIG. 5 may be used as the principal metering medium for discharging liquid from the cylinder to the reservoir in combination with a check valve associated with the metering tube to open only when liquid flows from the reservoir into the cylinder during a return stroke.

The terms and expressions which have been employed are used as terms of description and not of limitation and there is no intention of excluding such equivalents of the invention described or of the portions thereof that fall within the scope of the claims.

What is claimed is:

1. A hydraulic buffer which undergoes lengthwise contraction in response to loading comprising:
   (A) a cylinder having a head substantially enclosing its front end, and an open rear end;
   (B) an assembly comprising: a piston reciprocable in said cylinder, and a piston rod for the piston extending rearwardly of said open rear end of said cylinder;
   (C) a cylinder extension joining with the cylinder at said open-end and extending in coaxial relation with the rod and the cylinder rearwardly from the cylinder;
   (D) said assembly having an elongate opening co-extensive with at least a portion of said extension;
   (E) annular sealing means disposed between the rod and the inner surface of the extension carried by the rod lengthwise of the extension in fixed longitudinal relation with the rod, said means preventing passage of fluid from the space adjacent to the forward side of said means to region adjacent the rear side thereof;
   (F) a reservoir connected with said cylinder for the transfer of liquid from one to the other;
   (G) means for conducting liquid between said space and a liquid storage region comprising the cylinder and the reservoir;
   (H) said rod having duct means extending from an intermediate portion of the sealing means spaced between its front and rear ends for receiving any liquid escaping by the portion of the sealing means forwardly of the duct means; and
   (I) check-valve means and duct means opening only for passage of liquid from said space to said opening.

2. A hydraulic buffer which undergoes lengthwise contraction in response to loading comprising:
   (A) a cylinder having a head substantially enclosing the front end, and an open rear end;
   (B) an assembly comprising:
       (1) a piston reciprocable in said cylinder, and
       (2) a piston rod for the piston extending rearwardly from said open end;
   (C) a cylinder extension joining with the cylinder at said open end and extending in coaxial relation with the rod and the cylinder rearwardly from the cylinder;
   (D) annular sealing means disposed between the rod and the inner surface of the extension and carried lengthwise of the extension by the rod in fixed longitudinal relation with the rod, said means preventing passage of fluid from the space adjacent the forward side of said means to a region adjacent the rearward side thereof;
   (E) an elongate metering member fixed to said head and extending centrally lengthwise of the cylinder;
   (F) said assembly having an elongate opening for receiving said member extending lengthwise and interiorly of said rod from the front face of the piston;
   (G) a reservoir connected with the head for the exchange of liquid between reservoir and the interior of the cylinder;
   (H) duct and check-valve means in said assembly for transferring liquid from the elongate opening to said space;
   (I) said rod having duct means extending from a portion of the sealing means spaced from, and between, the front and rear ends of the sealing means to said opening; and
   (J) check valve means in said duct means opening only for passage of liquid from said space to said opening.

3. A hydraulic buffer which undergoes lengthwise contraction in response to loading comprising:
   (A) a cylinder having a head substantially enclosing its front end, and an open rear end;
   (B) an assembly comprising,
       (1) a piston reciprocable in said cylinder, and
       (2) a piston rod for the piston extending rearwardly from said open end;
   (C) a cylinder extension joining with the cylinder at said open end and extending in coaxial relation with the rod and the cylinder rearwardly from the cylinder;
   (D) annular sealing means disposed between the rod and the inner surface of the extension in fluid-sealing relation with both the rod and said inner surface and carried lengthwise of the extension by the rod in fixed longitudinal relation with the rod;
   (E) a hollow metering tube, open at both ends, fixed to said head, and extending centrally lengthwise of the cylinder;
   (F) said assembly having an elongate opening for receiving said tube extending lengthwise and internally of said rod from the front face of the piston;
   (G) a reservoir and liquid conducting means for transferring liquid through the head between the reservoir and the front open end of the tube;
   (H) said assembly having a passageway connecting said opening with said space;
   (I) check valve means in said passageway opening only for passage of liquid from said opening to said space;
   (J) said sealing means having an aperture along a portion thereof disposed between and spaced from the front and rear ends of the sealing means; and
   (K) said rod having duct means connecting said aperture and said opening and check valve means associated with the duct means for passage of liquid from said aperture into said opening.

4. The buffer of claim 3 comprising:
   (A) spring means for returning said assembly to a rearward position from a position disposing the piston forwardly within the cylinder;
   (B) said cylinder extension having a smaller diameter than the piston to render necessary the discharge of liquid from said space during a return stroke of the assembly;
   (C) said passageway and the check valve means associated therewith defining an orifice smaller than the passageway for metering liquid from said space to said elongate opening.

5. The buffer of claim 3 wherein:
   (A) said piston defines said passageway and said passageway also opens into the cylinder along the front face of the piston;

(B) the piston carries second check valve means in parallel arrangement with the first named check valve means of the passageway which opens only for passage of liquid from said opening to said cylinder;

(C) said cylinder extension has a smaller diameter than the piston to render necessary the discharge of liquid from said space during a stroke of said assembly rearwardly from a position of the piston frontwardly in the cylinder; and (D) said passageway and the first named check valve means defines an orifice smaller than the passageway for metering liquid from said space to said elongate opening.

6. The hydraulic buffer of claim 3 wherein:

(A) said cylinder is resiliently expandable under internal hydraulic pressure to develop a liquid transmitting clearance between a lateral wall portion and said head for discharging a controlled quantity of liquid from the cylinder into said reservoir.

7. A hydraulic buffer which undergoes lengthwise contraction in response to loading comprising:

(A) a cylinder having an end wall;
(B) a piston reciprocable in said cylinder; and
(C) a reservoir for liquid adjacent the end wall;

said cylinder being expandable relative to the end wall under internal hydraulic pressure enabling passage of liquid from the cylinder to the reservoir.

8. A hydraulic buffer which undergoes lengthwise contraction in response to loading comprising:

(A) a cylinder having an open rear end and a head substantially enclosing its front end;
(B) an assembly comprising:
  (1) piston reciprocable in said cylinder, and
  (2) a piston rod for the piston extending rearwardly of said open cylinder end;
(C) a cylinder extension joining with the cylinder at said open end and extending in coaxial relation with the rod and the cylinder rearwardly from the cylinder;
(D) annular means disposed between the outer surface of the rod and the inner surface of the extension in fluid-sealing relation with both the rod and said inner surface for sealing a space forwardly of the annular means with respect to a region rearwardly thereof;
(E) a reservoir and liquid metering means connecting the reservoir with said cylinder for the transfer of liquid from one to the other;
(F) means for conducting liquid between said space and a liquid storage region comprising the cylinder and the reservoir; and
(G) a cylindrical wall portion of the cylinder being expansible with respect to said head to provide a clearance for metering liquid from the cylinder into said reservoir.

9. In a hydraulic buffer construction including a housing having a cylinder and a piston operative therein with a piston-rod projecting substantially beyond one end of the housing:

(A) a cylinder extension about a substantial portion of the piston rod in spaced relation and defining a return stroke buffer chamber back of the piston;
(B) an elongated metering member fixedly concentric within the cylinder;
(C) the piston rod having a bore therein opening through the piston and accommodating said metering member for metering hydraulic fluid from the cylinder in front of the piston into said bore;
(D) means for metering hydraulic fluid from said bore into said buffer chamber back of the piston during a pressure working stroke of the piston and piston-rod in the cylinder and cylinder extension;
(E) means restraining return of hydraulic fluid from said buffer chamber during return strokes of the piston and piston-rod so as to afford return stroke resistance pressure to the piston;
(F) a bearing on, and moving with, the piston-rod spaced from the back of the piston and engaging slidably in the cylinder extension and providing a closure for said buffer chamber;
(G) sealing means on the piston-rod associated with the outer end of the bearing to prevent escape of hydraulic fluid that may leak past the bearing due to said return stroke resistance pressure;
(H) a pressure relief passageway from the sealing means through the piston rod into said bore for draining the hydraulic fluid leakage from said sealing means during return strokes of the piston and piston-rod; and
(I) check valve means in said pressure relief passageway closing the passageway during pressure working strokes of the piston and piston-rod and opening the passageway during return strokes to the piston and piston-rod.

No references cited.

ARTHUR L. LA POINT, *Primary Examiner.*